F. McDONOUGH.
Saw Arbor.
No. 243,076.　　　　　Patented June 21, 1881.
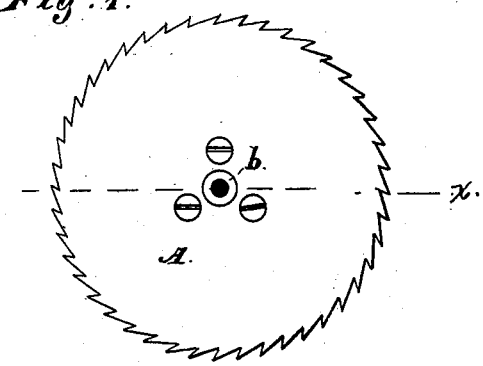
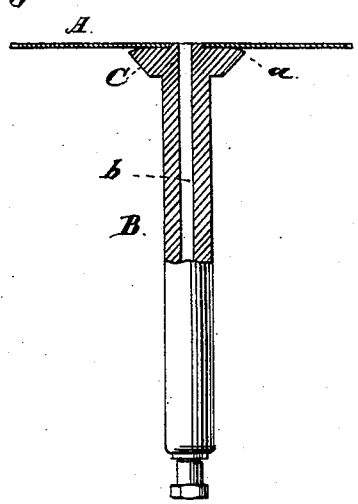
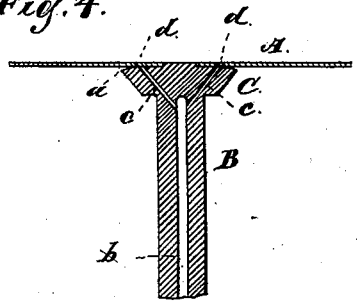
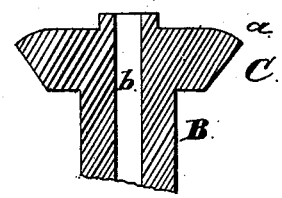
Witnesses:
Inventor:
Frank McDonough.
By West & Bond Attys

UNITED STATES PATENT OFFICE.

FRANK McDONOUGH, OF EAU CLAIRE, WISCONSIN.

SAW-ARBOR.

SPECIFICATION forming part of Letters Patent No. 243,076, dated June 21, 1881.

Application filed February 6, 1880.

To all whom it may concern:

Be it known that I, FRANK MCDONOUGH, residing at Eau Claire, in the county of Eau Claire and State of Wisconsin, and a citizen of the United States, have invented new and useful Improvements in Saw-Arbors, of which the following is a full description, reference being had to the accompanying drawings, in which—

Figure 1 is a top view. Fig. 2 is a vertical section at line $x$ of Fig. 1; Fig. 3, an enlarged detail; Fig. 4, a modification.

It is customary to use collars upon saw-arbors for the purpose of supporting the center of circular saws and to aid in holding the saw securely in place. The face of collars so used has heretofore been made flat, all parts thereof coming in close contact with the saw; and saws are frequently broken by being strained while in use over the abrupt edge of the collar.

To obviate this difficulty, and also to provide improved means for cooling circular saws by the application of water thereto, are the objects of my improvements, which I accomplish by rounding the edge of the collar and by applying water to the upper surface of the saw, all as more fully hereinafter set forth.

In the drawings, A represents a circular saw, which is mounted upon an arbor, B, which arbor is designed to stand in a vertical position, the saw running in a horizontal position.

C is a collar on the arbor B, to which collar the saw is secured, as usual. The face of the collar is not perfectly flat, but it is rounded at its outer edge, $a$, as shown. By this construction the saw can be sprung considerably in use without being bent over a sharp or abrupt edge, and the danger of accidentally breaking the saw is thereby very much diminished.

The arbor B, as shown in Fig. 2, is hollow throughout, and the lower end is provided with suitable devices for holding a pipe, through which water can be introduced to the passage $b$ through the arbor. The water is to be introduced into the arbor under pressure sufficient to cause the water to flow from the top of the arbor onto the upper face of the saw, over which it will be distributed while the saw is in motion by centrifugal force, keeping the saw cool and at a nearly uniform temperature. The water could be introduced into the arbor through passage $c$ $c$, the collars, or at some other point than those mentioned, by the use of suitable devices; but it will, I think, be usually more convenient to introduce it as first described.

What I claim as new, and desire to secure by Letters Patent, is as follows:

The combination, with a circular saw and the arbor, of an attached collar, C, having a flat face and the rounded edge $a$, the saw resting against the flat face, substantially as and for the purpose described.

FRANK McDONOUGH.

Witnesses:
J. E. McGRATH,
JOHN J. KEITH.